No. 897,356. PATENTED SEPT. 1, 1908.
D. T. DAY.
METHOD OF DRYING AIR FOR BLAST FURNACES.
APPLICATION FILED JAN. 5, 1905.
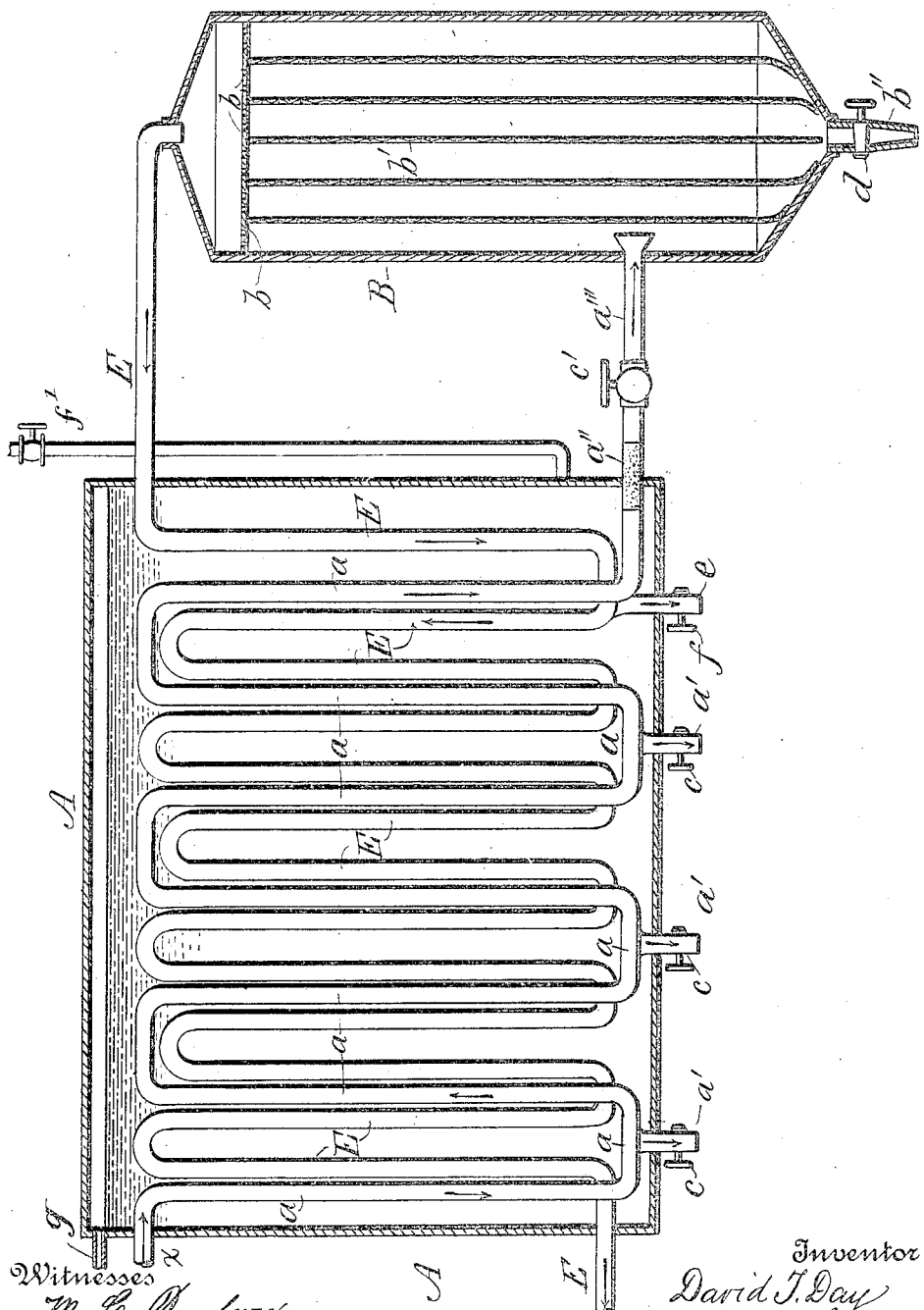

UNITED STATES PATENT OFFICE.

DAVID T. DAY, OF WASHINGTON, DISTRICT OF COLUMBIA.

METHOD OF DRYING AIR FOR BLAST-FURNACES.

No. 897,356.  Specification of Letters Patent.  Patented Sept. 1, 1908.

Application filed January 5, 1905. Serial No. 239,820.

*To all whom it may concern:*

Be it known that I, DAVID T. DAY, a citizen of the United States, residing at Washington, District of Columbia, have invented certain new and useful Improvements in Methods of Drying Air for Blast-Furnaces, of which the following is a specification.

This invention relates to a method of drying air for use in blast furnaces and other purposes.

The object of my invention is to provide a convenient, effective and economical method of drying air and delivering it at the ordinary pressure of about fifteen pounds to a blast furnace or other place of use.

For the purpose of illustration I will describe my invention as applied to drying air for blast furnaces but wish it understood that it is not confined to such particular use.

The matter constituting my invention will be set forth in the claims.

I am well aware of the advantages of drying air by cooling it by ordinary refrigerating pipes containing brine over which the moist air is passed, and with the result of depositing the moisture on the tubes, in the form of ice. It is difficult to cool all the air passing from the blowing engines by this means as much of the air does not come in contact with the cooling surface. I purpose therefore, to dispense with ordinary refrigerating apparatus and to cool the air by internal cooling resulting from expanding the air by partial release of pressure after first compressing the air to a pressure of more than the usual fifteen pounds pressure produced by the blowing engine. In this high compression, according to my method, much heat is liberated which is absorbed by maintaining cool water or other fluid around the air tubes. In this I am also taking advantage of the principle that it is more economical to cool to the ordinary temperature by a fluid at the ordinary temperature than to take out the same amount of heat by cooling below the environment.

The accompanying drawing represents in sectional elevation an apparatus adapted for carrying out my process.

Within a suitable tank A, containing water, and which is provided with a supply pipe $f'$ and a discharge pipe $g$, is placed my series of U shaped pipes $a$, having an inlet pipe $x$, and a final outlet pipe $a''$ which is preferably made of terracotta or other nonconducting material. At the lower end of each U shaped couple of the pipes $a$, is connected a drip pipe $a'$ having a valve $c$ for drawing off water of condensation. The pipe $x$ leads from a compression chamber with which is connected an air compressor, not here shown, for compressing air to a pressure of from fifty to one hundred pounds. To the outlet pipe $a''$ is connected a delivery pipe $a'''$ which opens into the expansion chamber B and is provided with a pressure reduction valve $c'$. The chamber B is preferably provided at the top with a horizontal perforated partition $b$ and at the bottom with a drip pipe $b''$, having a valve $d$. I preferably connect to the plate $b$, sheets or strips of coarse fabrics $b'$, such as gunny-bag fabric, or similar material, for assisting in condensation of moisture from the expanded air. With the top of chamber B is connected the pipe E which is bent in a serpentine coil within the tank A, and adjacent to the U shaped pipes $a$, and the outlet may connect with a blast furnace or other places of use. A drip pipe $e$, having a valve $f$, may connect with each of the lower bends of the serpentine pipes E.

In the process for which I claim Letters Patent the operation of cooling and drying air is effected in the following way. By means of an air compressor, (not here shown) the air is compressed to a pressure of from fifty to one hundred pounds and delivered into a compression chamber and thence, by pipe $x$, into a series of, preferably, U shaped pipes $a$, which are kept cool by circulating water or other suitable fluid around them at the ordinary temperature, in tank A, and thence delivered into the expansion chamber B. By means of a check valve, or a pressure reduction valve $c'$ the air is released and the pressure is reduced to 15 pounds and the temperature of all the air is reduced to within a few degrees of the freezing point, when the moisture is sufficiently condensed on the inner surface of the tubes containing the air, so that the expanded air is left dry enough for blast furnace purposes. The water is drained off from the bottom of the series of U shaped tubes by means of the drip pipe $a'$ and valves $c$. In ordinary practice much water is condensed from the moist condensed air when first compressed and cooled by water to the ordinary temperature. Water of condensation is also drawn off from chamber B, through pipe $b''$ and valve $d$. The dry air after passing from the precipitating tubes, and chamber B, is next passed in tubes E, through the water used to cool the compressed air, and aids by its low temperature, in maintaining the ordinary temperature in the water vat A, where the compressed air is cooled.

Having described my invention, what I claim, and desire to secure by Letters Patent, is—

1. The method of drying air for blast-furnaces which consists in compressing air to a degree above the pressure of ordinary blowing engines, then cooling such compressed air in pipes or conduits to the ordinary temperature by means of a circulating fluid in contact with the pipes, drawing off water of condensation therefrom, then expanding such cooled air by a controlling device to the ordinary fifteen pound pressure of the blast admitted to blast-furnaces, thereby further cooling and drying it, and by means of such cooled and expanded air cooling the circulating fluid in contact with the pipes or conduits conveying the compressed air and drawing off the water of condensation from the expanded air.

2. The method of drying air for blast furnaces which consists in compressing air to a pressure above the pressure of fifteen pounds of the ordinary blowing engine, then cooling such highly compressed air to the ordinary temperature by exposing it in pipes to the circulation of a fluid, then expanding such compressed and cooled air, approximately, to the pressure of fifteen pounds of air admitted to blast-furnaces, thereby further cooling and drying it, drawing off water of condensation and passing such cool, dry air through pipes in the cooling fluid in contact with the pipes conveying the highly compressed air, for maintaining such fluid at the ordinary temperature.

3. The method of drying air for blast furnaces which consists in compressing air to a pressure between fifty and one hundred pounds pressure and storing it in pipes, then cooling such air to the ordinary temperature by circulation of water, maintained at approximately the ordinary temperature, in contact with said pipes conveying the compressed air, then expanding such cooled air by a controlling device to about fifteen pounds pressure required in blast admitted to blast furnaces, thereby further cooling it and causing its moisture to be deposited passing this cooled expanded air through pipes in said cooling water, and delivering it to a blast furnace.

In testimony whereof I affix my signature in presence of two witnesses.

DAVID T. DAY.

Witnesses:
ALTHA T. COONS,
E. B. CLARK.